Figure 1:
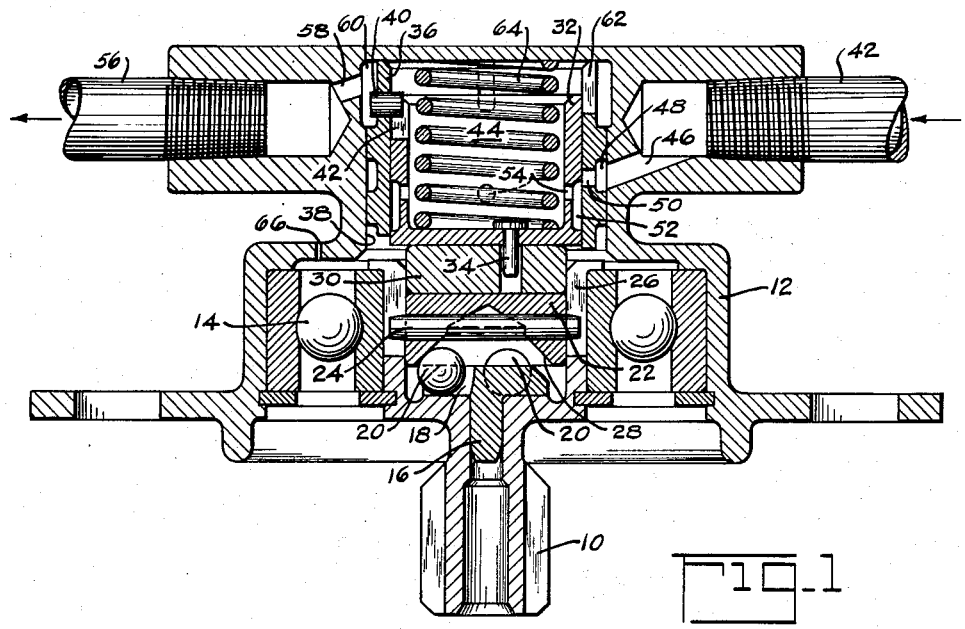

Nov. 3, 1953   H. E. BARRETT ET AL   2,657,699
FLUID PRESSURE SPEED SENSING DEVICE
Filed Jan. 29, 1949

INVENTORS
HILLARD E. BARRETT.
SAMUEL J. HALL
WILLIAM C. SCHAFFER
BY Victor D. Behm
ATTORNEY Patented Nov. 3, 1953

2,657,699

UNITED STATES PATENT OFFICE 2,657,699

FLUID PRESSURE SPEED SENSING DEVICE

Hillard E. Barrett, East Orange, Samuel J. Hall, Lodi, and William C. Schaffer, Fair Lawn, N. J., assignors to Curtiss-Wright Corporation, a corporation of Delaware Application January 29, 1949, Serial No. 73,562

1 Claim. (Cl. 137—53)

This invention relates to speed sensing mechanisms and is particularly directed to such mechanisms providing a fluid pressure which is a function of the speed of rotation of a rotating member.

A primary object of this invention is the provision of a novel and simple speed sensing mechanism for obtaining a fluid pressure which is a function of the speed of rotation of a rotating member. A further object of the invention relates to the provision of such a mechanism in which no fluid pressure seals are necessary between the fixed and rotating parts of the mechanism and which is applicable to measurement and/or control of high rotative speeds. Such a mechanism may be used to measure and/or to control the speed of rotation of an engine or other rotating parts.

Figure 2:
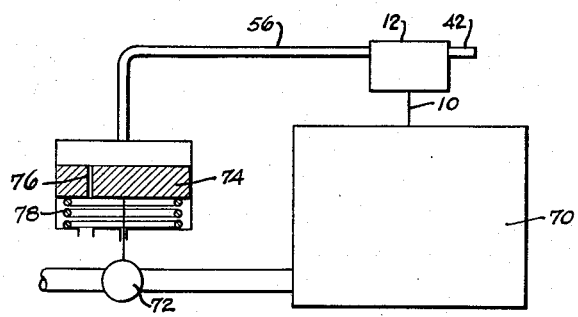

Other objects of the invention will become apparent upon reading the annexed detailed description in connection with the drawing in which:

Figure 1 is a sectional view through a speed sensing mechanism embodying the invention; and Figure 2 is a view schematically illustrating use of said speed sensing mechanism for controlling the speed of rotation of an engine.

Referring to the drawing, a shaft 10, whose speed of rotation is to be sensed extends into a housing 12 of the speed sensing mechanism, said shaft being journaled in said housing by a bearing 14. A guide member 16 has a stem tightly fitted within a bore in the shaft 10 for rotation with said shaft. Said guide member 16 also has a plurality of circumferentially spaced notches 18 about its periphery and a spherical ball or flyweight 20 is disposed in each of said notches. An axially movable thrust member 22 is slidably fitted within the cup-shaped end of the shaft 10. The thrust member 22 is keyed to the shaft 10 for rotation therewith by a pin 24 extending through the thrust member into axially extending slots 26 in the cup-shaped end of said shaft. The thrust member 22 also has a conical surface 28 facing and engageable by the spherical balls 20.

A block or disc 30 has a flat surface engageable with a flat surface of the thrust member 22. The block 30 is connected to a piston 32 by a pin 34 to prevent relative rotation between said block and piston. The piston 32 is slidably fitted within a sleeve 36 having a tight fit with a bore 38 in the housing 12. A pin 40 secured to the sleeve 36 extends into a slot 42 within the piston to prevent rotation of the piston whereby the pin 34 also prevents rotation of the block 30. The block 30 is made of suitable anti-friction material such as graphite or carbon and comprises an axial thrust bearing for transmitting the axial thrust of the rotating thrust member 22 to the non-rotating piston 32. The block or disc 30 can be made of any material having a low coefficient of friction relative to the thrust member 22 and requiring no external lubrication. The pin 34 insures that all relative rotation occurs between the block 30 and the rotating thrust member 22.

A fluid under pressure is supplied to the speed sensing mechanism through a conduit 42. From the conduit 42 said fluid is transmitted to the space 44 behind the piston 32 through a passage 46, an annulus 48 about the sleeve 36, a radial hole 50 through said sleeve, an annulus 52 about the piston 32 and thence through radial holes 54 in said piston. As the piston 32 moves axially, the upper edge of the annulus 52 (as viewed in the drawing) moves across the hole 50 thereby varying the extent to which said hole is uncovered. An outlet conduit 56 also communicates with the space 44 through a passage 58, an annular groove 60 and slots 62 in the sleeve 36. There is a continual leakage flow of fluid through the outlet conduit 56 in order that movement of the piston 32 controls the pressure in the space 44 by varying the pressure drop through the portion of the hole 50 uncovered by the piston annulus 52. The fluid pressure within the space 44 urges the conical face of the thrust member 22 against the balls 20. A spring 64 may also be provided for urging the thrust member 22 against the balls 20. When the axial thrust exerted by the balls 20 against the thrust member 22 is less than the force of the spring 64, the piston 32 moves downwardly to such an extent that the lower end of the piston annulus 52 moves beyond the sleeve 36 whereupon the hole 50 is closed and the space behind the piston is vented through the restricted opening 66.

With the above described construction, when the shaft 10 rotates the balls 20 rotate with said shaft and therefore said balls are urged radially outwardly, by centrifugal forces acting thereon, against the conical face 28 of the thrust member 22. Accordingly the thrust member 22 is urged axially by the axial component of the force exerted by the balls 20 against the conical face 28. This axial force or thrust is transmitted by the thrust member 22 through the block 30 to the piston 32 and is opposed by the fluid pressure in the space 44 acting against said piston and in addition, if a spring 64 is provided, by the force exerted by said spring. If the axial thrust produced by the balls 20 exceeds the combined opposing forces of the spring 64 and the fluid pressure within the space 44 the piston 32 is moved upwardly, as viewed in the drawing, thereby increasing the extent to which the hole 50 is uncovered. This upward motion of the piston 32 continues until the pressure within the space 44 has increased sufficiently to again establish a balance. If the speed of rotation of the shaft 10 decreases, the axial thrust produced by the balls decreases so that the piston is now moved downwardly by its spring 64 and by the fluid pressure within the space 44 until said piston covers the hole 50 to an extent such that the pressure within said space is reduced sufficiently to again establish a balance. Thus the piston 32 always takes an axial position such that the fluid pressure within the space 44 plus the pressure of the spring 64 always balances the axial thrust produced by the balls 20. In this way the piston 32 automatically moves to maintain a pressure within the space 44 which is a function of the speed of rotation of the shaft 10.

Figure 2 is a schematic illustration of an application of the speed sensing mechanism 12 for controlling the speed of rotation of an engine indicated on the drawing by the block 70. The shaft 10 is driven by the engine 70 and said engine is provided with means 72, such as a valve, which is adjustable to vary the speed of rotation of the engine. As a specific example the engine 70 and valve 72 may comprise the turbine and balanced speed control valve respectively, disclosed in copending application Serial No. 57,144, filed October 29, 1948, now abandoned. The fluid pressure automatically controlled by the speed sensing mechanism 12 is transmitted through the conduit 56 to one side of a piston 74 which is operatively connected to the means or valve 72, the other side of said piston being vented. The piston 74 has a restricted leakage path 76 to provide for the previously mentioned fluid flow through the conduit 56. In addition a spring 78 acts against the piston 74 to oppose the fluid pressure transmitted through the conduit 56 to said piston. Accordingly an increase in the output pressure of the speed sensing mechanism 12, as a result of an increase in the speed of the shaft 10, moves the piston 74 against the spring 78. This movement of the piston 78 adjusts the member 72 in a direction for decreasing the speed of rotation of the engine 10. A decrease in the output pressure of the speed sensing mechanism produces an opposite adjustment of the speed regulating member 72.

If for example the speed of the shaft 10 of the engine 70 is to be held between 40,000 and 44,000 revolutions per minute (R. P. M.) then the spring 64 is designed so that its spring force is equal to the axial thrust produced by the balls 20 at 40,000 R. P. M. In addition the piston 32 and its ports are designed so that at or below 40,000 R. P. M. the pressure within the space 44 is a minimum, that is said space is vented, and as the speed increases from 40,000 to 44,000 R. P. M. the hole 50 is progressively uncovered by the piston 32 until at 44,000 R. P. M. said hole is fully uncovered whereupon the pressure within the space 44 is a maximum. Obviously, however, the spring 64 is not a necessary part of the invention. For example, if the spring 64 were omitted then the fluid pressure within the space 44 could be proportional to the speed of the shaft 10 throughout its speed range instead of only within the upper portion of the speed range. It is assumed that sufficient fluid pressure is available through the conduit 42 to balance the axial thrust at the maximum speed of the shaft 10.

It should be noted that the shaft guide member 16 and the thrust member 22 all rotate at the same speed with the shaft 10 so that except for the small radial movements of the balls 20 there is no relative motion, sliding or rolling, between said balls and the surfaces engaged thereby. Accordingly there is no tendency for the balls to roll up the conical surface 28 except as a result of changes in the centrifugal forces acting on said balls. This feature is quite important at the high rotative speeds herein contemplated.

While we have described our invention in detail in its present preferred embodiment, it will be obvious to those skilled in the art, after understanding our invention, that various changes and modifications may be made therein without departing from the spirit or scope thereof. We aim in the appended claim to cover all such modifications.

We claim as our invention:

Speed sensing mechanism comprising a housing; a rotatable first member extending into said housing; a rotatable second member disposed within said housing; means within said housing providing a rotationally rigid driving connection between said members while permitting axial movement of said second member relative to said first member; at least one ball disposed within said housing between said members and offset from the axis of rotation of said members; means for insuring rotation of said balls with said members about said axis; a conical surface on and co-axial with one of said members and engageable by each said ball so that the centrifugal force acting on each said ball subjects said second member to an axial force; a third member disposed within said housing co-axial with and axially movable with said second member; means within said housing for preventing rotation of said third member; a thrust bearing in said housing between said second and third members for transmitting axial motion of said second member to said third member; means for supplying a fluid under pressure into said housing for subjecting said third member to a fluid pressure force opposing said axial force, said second and third members being axially movable in response to unbalance of the forces thereon; and valve means disposed within said housing and automatically controlled by axial movements of said third member for respectively increasing or decreasing the magnitude of said fluid pressure in response to axial movements of said third member in or opposite to the direction of said axial force whereby the magnitude of said fluid pressure respectively increases and decreases with increase and decrease in the speed of rotation of said first and second members.

HILLARD E. BARRETT.
SAMUEL J. HALL.
WILLIAM C. SCHAFFER.

References Cited in the file of this patent

UNITED STATES PATENTS

| Number | Name | Date |
| --- | --- | --- |
| 2,013,222 | Thomas | Sept. 3, 1935 |
| 2,155,247 | Warner | Apr. 18, 1939 |
| 2,250,983 | Adler | July 29, 1941 |
| 2,277,395 | Franck | Mar. 24, 1942 |
| 2,336,654 | Tippen | Dec. 14, 1943 |
| 2,402,972 | Mitchell | July 2, 1946 |
| 2,454,902 | Warren | Nov. 30, 1948 |

FOREIGN PATENTS

| Number | Country | Date |
| --- | --- | --- |
| 579,868 | France | of 1924 |